June 29, 1943.　　　　J. S. ZELL　　　　2,322,993

VERTICALLY ADJUSTABLE BIFOCAL SPECTACLES

Filed Feb. 10, 1941

JULIUS S. ZELL
INVENTOR.

BY
ATTORNEYS

Patented June 29, 1943

2,322,993

UNITED STATES PATENT OFFICE 2,322,993

VERTICALLY ADJUSTABLE BIFOCAL SPECTACLES

Julius S. Zell, Portland, Oreg.

Application February 10, 1941, Serial No. 378,200

4 Claims. (Cl. 88—43)

My invention relates to spectacles having lenses with bifocal segments respectively adapted to facilitate distant vision as well as reading or the viewing of near objects. In the use of spectacles of this character as commonly made, supporting the lenses in one position on the nose, the user when reading a book lying on the table must turn his eyes down and hold his head back in order to aline the centers of the reading segments of the lenses with the centers of the pupils or line of vision of the reader.

The use of bifocal lenses when the two segments are concomitantly used and not properly positioned in registration with the line of vision will cause a blurred image on the retina, and the imperfect focusing will create an impulse to accommodation which does not meet with a satisfied response, and in consequence, tends to fatigue the muscles of accommodation, or the visual centers of the brain.

To prevent such fatigue spectacle frames have heretofore been devised which provided means by which the lenses could be supported at two levels, upper and lower, on the nose, in that way enabling the user of the spectacles to place the centers of the segments as required for a longer period of use of either of the segments; in other words, adjusting the position of the bifocal lenses and locating the principal axes of the segments so as to follow the visual axis of the eyes, thereby obtaining a more comfortable vision.

The advantage of positioning the lower segments of bifocal lenses at a higher level to facilitate reading, or the doing of certain kinds of close-up work is well understood. Furthermore by such adjustment, a person engaged in a vocation necessitating a close-up view of objects located above the eye level can raise the said lower segments so as to facilitate the seeing of the nearby high-up objects.

For example,

A carpenter fitting upper hinges in a door would ordinarily require something to stand on so that his working distance is below his eye level, and would necessitate the jumping up and down should he need some other tool. With my improved spectacles however, the carpenter can work from the floor, with his lenses so adjusted as to enable him to see clearly both the upper and lower hinges without even changing his head position.

A grocer looking at labels on shelves, or watching the scales above him, does not have to throw his head back or raise his glasses with one hand.

Many different types of spectacle frames have heretofore been provided for rendering the lenses or the lens-holding frame sections of spectacles vertically adjustable in two positions on the nose, but the devices heretofore provided have not been found practical, because they involved too many mechanical parts, were too cumbersome and rather difficult to make, and because the spectacles did not present a neat appearance when worn.

The object of my invention is to provide in bifocal-spectacles simple means, by which the bifocal lenses may be vertically adjusted to two positions as required to facilitate the desired vision; such means to consist of inconspicuous devices, and which will not add greatly to the cost of making of the spectacles.

I attain my object in the combination comprising, bifocal lenses, or frame sections carrying such lenses, connected by a spring member adapted to permit the movement of the lenses apart, a bridge member and toggle joint connections to permit the movement of the bridge member above or below the points of connection of the toggle joints to the lenses and thus the bringing of the centers of either of the lens segments into convenient registration with the line of vision.

Further details of construction and operation of my invention are hereinafter fully described with reference to the accompanying drawing.

Figure 2:
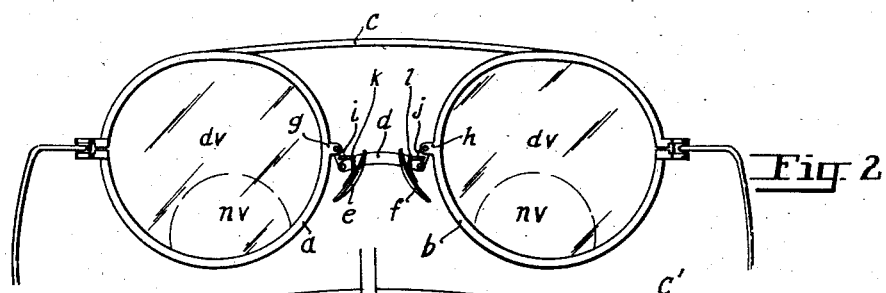
Figure 2 is a view similar to Figure 1, but in this figure the bridge member is adjusted to raise the lenses to their high position on the nose, and thus to bring the reading, or close-vision segments of the lenses into convenient registration with a higher line of vision.
Figures 3, 3A:
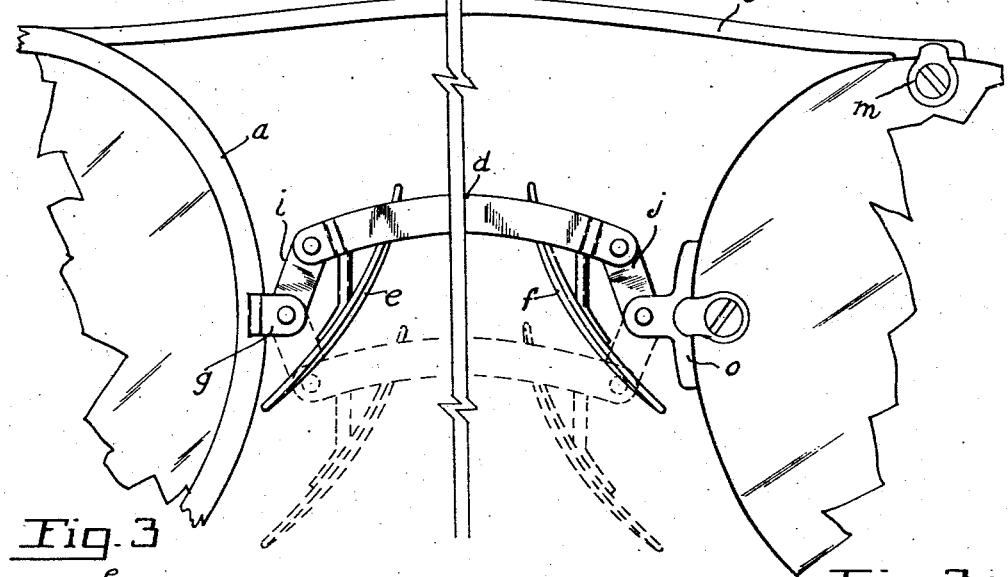
Figure 4:
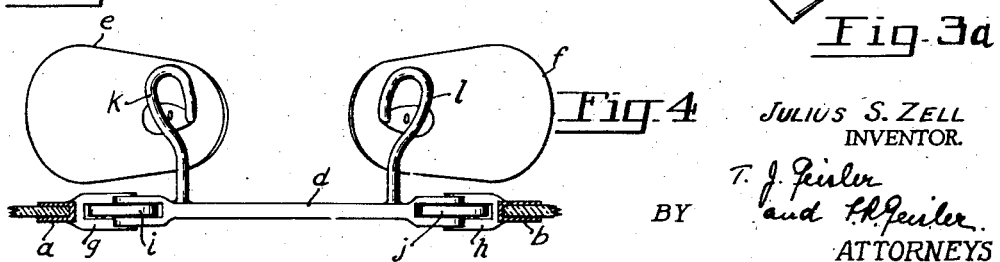

Fig. 3 is an enlarged fragmentary detail of the left-hand middle portion of bifocal spectacles embodying one form of my invention; and Fig. 3a is an enlarged fragmentary detail of the right-hand middle portion of rimless spectacles embodying my invention. In either of said portions of these figures the lens-supporting devices arranged as shown in Fig. 1 are shown in full lines; while the said devices arranged as shown in Figure 2 are shown in broken lines;

Figure 4 is a fragmentary top-view of the lens frame positioning means of Figure 3.

Figure 1:
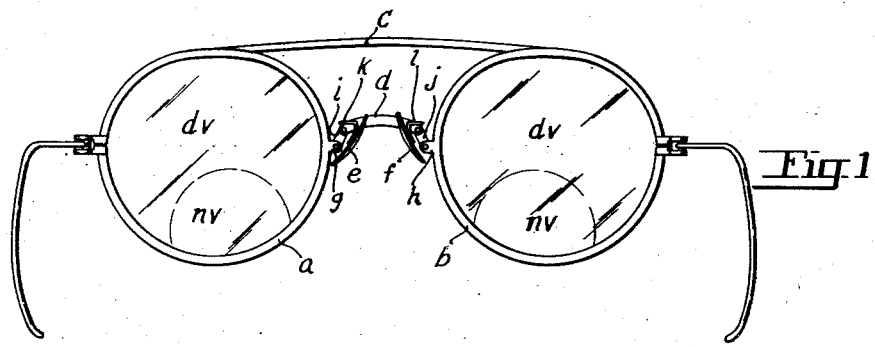
Figure 1 shows bifocal spectacles embodying my invention, and shows my spectacles adjusted to the position in which they are usually worn enabling the wearer to use either the reading segments or the distant vision segments of the lenses.

The drawings in Figures 1 and 2 illustrate one practical manner of applying my invention to the frame of rim-type bifocal spectacles in which $a$ and $b$ are the two lens-holding frame sections. Each section holds a lens composed of a distant-view segment $dv$, and near-view segment $nv$. The lens-holding sections are connected by a top spring member $c$ adapted to permit the manual movement of said lens-holding frame sections $a$ and $b$ apart. $d$ is a bar-like nose-piece or bridge member provided with rigid nose rests, $e, f$. The inner, opposed ends of the lens-holding frame sections $a$ and $b$ are respectively provided with ears $g, h$. The ends of the nose piece or bridge member $d$ are connected by toggle joints $i, j$ to the ears $g, h$ of the lens-holding frame sections, said toggle joints being conveniently made of links, the ends of which are pivotally secured to the ears $g, h$ and the ends of the nose-piece $d$ respectively, as more clearly shown in Figure 3. In Figure 3 the top spring-member $c$ is shown as fastened to the tops of the frame sections $a$, and the ears $g$ are also fastened directly to said frame sections.

In Figure 3a the top spring-member $c'$ is shown as fastened directly to the upper portions of the lenses by means of clips $m$ and the ears are fastened to the lenses by clips $o$. The described construction permits the adjustment of the nose-piece or bridge member $d$ so as to raise or lower the level of the lower reading or close-up segments $nv$ as convenient for the user of the spectacles.

The nose-rests $e, f$ may be rigidly-fastened to the bar-like nose piece $d$ by arms $k, l$, as shown in Figure 4, or by any other convenient means.

The positioning of the near-view or reading lens segments $nv$ at higher or lower level on the nose may be accomplished by one hand.

All that is required to be done is to spread the lens-holding frame sections $a, b$ or the lenses, if rimless spectacles, slightly apart, and then move and adjust the nose-piece or bridge member $d$ up or down, thus in the position as shown in Figure 1 or Figure 2, such movement being facilitated by the flexibility of the toggle joints $i, j$.

The lengths of the links $i$ and $j$ are such that whether the devices supporting the lenses are arranged as shown in full lines or in broken lines in Figure 3, the spring-member $c$ will retain the nose-piece or bridge member $d$ in either its upper or lower position.

As apparent from Figs. 1 and 2, the devices employed by me for supporting the lenses at lower or higher level are inconspicuous, and the structure of my improved bifocal spectacles as a whole is of neat appearance.

Without limiting myself to the details of construction except as essential to my invention,

I claim:

1. In spectacles provided with lenses having bifocal segments, the combination of frame-sections holding said lenses, a spring member connecting said sections and adapted to permit their movement apart, a bridge member provided with nose rests, toggle-joint connections between said sections and the ends of said bridge member, said connections adapted to permit the adjustment of said sections to high and low positions on said bridge member with the movement of said sections apart; and said bridge member being retained in either its upper or lower position by the tension of said spring member.

2. In spectacles provided with lenses having bifocal segments, the combination of frame-sections holding said lenses, a spring member attached to the middle upper portions of and connecting said sections and adapted to permit their movement apart, a bridge member provided with nose rests, toggle-joint connections between said sections and the ends of said bridge member, said connections adapted to permit the adjustment of said sections to high and low positions on said bridge member with the movement of said sections apart, and said bridge member being retained in either its upper or lower position by the tension of said spring member.

3. In spectacles provided with lenses having bifocal segments, the combination of frame-sections holding said lenses, a spring member attached to the upper portions of and connecting said sections and adapted to permit their movement apart, ears on the inner opposed portions of said sections, a bridge member provided with nose rests, toggle-joint connections between said ears and the ends of said bridge member, said connections adapted to permit the adjustment of said sections to high and low positions on said bridge member with the movement of said sections apart, and said bridge member being retained in either its upper or lower position by the tensioning of said spring member.

4. Spectacles comprising the combination of lenses having bifocal segments, a spring member attached to and extending between the upper portions of the lenses, and adapted to permit their movement apart, a bridge member provided with nose rests, and toggle joint connections between the ends of said bridge member and said lenses, said connections adapted to permit the movement of the bridge member above or below the points of connection of the toggle joints to the lenses, and said bridge member being retained in either its upper or lower position by the tension of said spring member.

JULIUS S. ZELL.